United States Patent [19]

Ellenburg

[11] 3,712,473

[45] Jan. 23, 1973

[54] REVERSE OSMOSIS MODULE

[75] Inventor: George W. Ellenburg, Pittsburgh, Pa.

[73] Assignee: Westinghouse Electric Corporation, Pittsburgh, Pa.

[22] Filed: March 3, 1971

[21] Appl. No.: 120,587

[52] U.S. Cl. ............... 210/321, 210/342, 210/433, 210/496
[51] Int. Cl. ........................................... B01d 31/00
[58] Field of Search......210/321, 323, 342, 433, 490, 210/496, 23, 346, 487

[56] References Cited

UNITED STATES PATENTS

| | | |
|---|---|---|
| 3,544,358 | 12/1970 | Manjikian.................210/49 UX |
| 609,769 | 8/1898 | Barr..........................210/487 X |
| 3,400,825 | 9/1968 | Shippey.....................210/433 X |
| 3,610,418 | 10/1971 | Calderwood...............210/490 X |

*Primary Examiner*—Frank A. Spear, Jr.
*Attorney*—A. T. Stratton, E. P. Lyle and F. Cristiano, Jr.

[57] ABSTRACT

A reverse osmosis module is formed from a porous sand bar having a plurality of tubular osmotic membranes disposed in longitudinal holes therein, and having an enveloping membrane embracing the outer peripheral surface of the bar, the ends of the bar being sealed with epoxy. An effluent tap is provided and is in communication with the porous bar to drain the liquid which passes through the osmotic membrane, so that when the bar is submerged in an influent pressurized liquid, the pressurized liquid applies outwardly directed forces to the tubular osmotic membrane and inwardly directed forces on the enveloping membrane and on the epoxy ends of the bar, thus subjecting the bar to compressive forces only.

5 Claims, 3 Drawing Figures

REVERSE OSMOSIS MODULE

BACKGROUND OF THE INVENTION

This invention relates to reverse osmosis modules and more particularly to such modules having the supporting matrix for the osmotic membrane so disposed as to be subject to compressive forces only.

Certain membranes will act as osmotic membranes in reverse and allow solvent to pass through the membrane and separate from the influent liquid having a high concentration of solids, when the influent liquid is pressurized to a pressure greater than the osmotic pressure of the influent liquid. When the influent liquid is brine, the solvent, water, which passes through the osmotic membrane, has sufficiently low concentration of dissolved solids to be potable. The osmotic membranes are delicate and would rupture when subjected to the pressure differential necessary to produce the reverse osmotic flow through the membrane, if the membranes were not supported, generally, over their entire surface area. Thus, the support matrix must support the entire surface area of the membrane and yet allow the solvent to seep through the osmotic membranes. The osmotic membranes and supports are made in modular form to facilitate assembly of large units from a plurality of relatively small groups of osmotic membranes as each membrane must undergo individual testing, for a single pin hole could render the product unsuitable for use.

Osmotic modules presently utilized are formed by casting a sand support matrix in a section of pipe, the matrix is cast with a series of longitudinal holes extending therethrough. The sand matrix is bonded by a suitable binder, such as is frequently used in a foundry to make sand cores and molds. A film of semi-permeable material such as cellulose acetate is disposed on the walls of the holes to form an osmotic membrane when cured. Influent liquid pressurized from 50 to 600 psi is supplied to the inside of the membrane, subjecting the matrix to both tensile and compressive forces. The outer periphery of the matrix is normally bonded to the pipe. Reference may be made to the copending application assigned to the same assignee and filed Aug. 22, 1968., U.S. Ser. No. 754,581, now U.S. Pat. No, 3,598,241, for a more detailed description of the sand support. Difficulty has been experienced with this arrangement in obtaining the proper structural strength in the support matrix, so that it will withstand the tensile forces generated in the webs formed between the holes and so that it will not crack due to improper filling of the pipe, shrinkage during curing, and excessive porosity of the sand. Cracks in the sand support matrix may permit rupture of the osmotic membrane rendering the production from the module nonpotable, when salt water is being processed, as a pin hole in the osmotic membrane is sufficient to lower the rejection rate of the membrane beyond acceptable limits.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
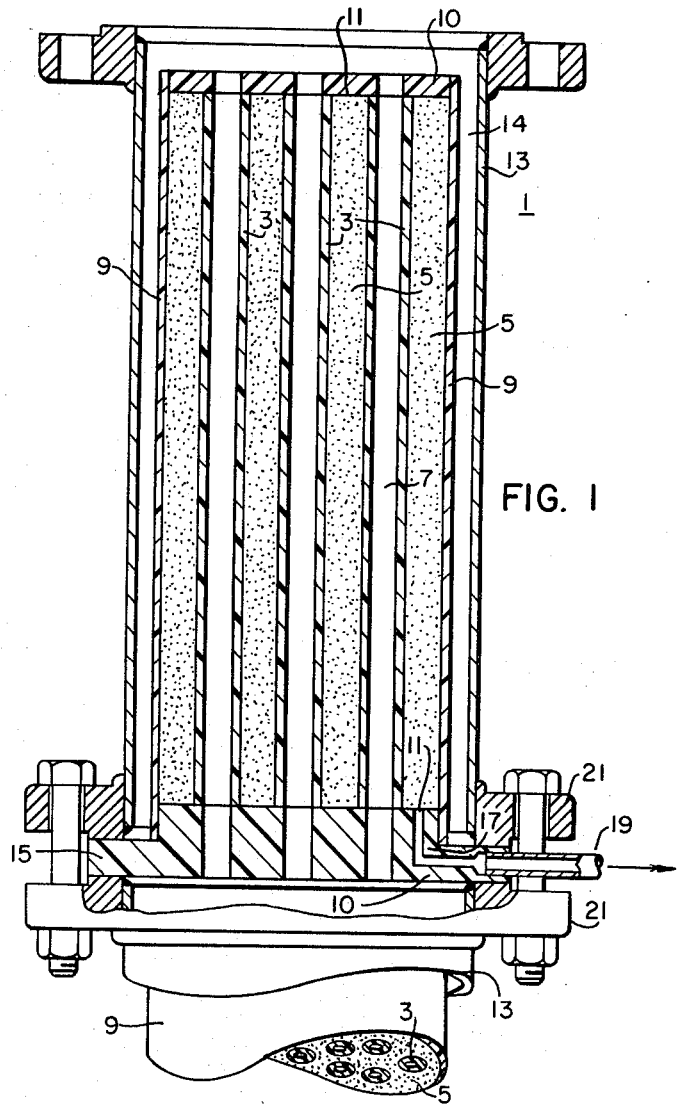
FIG. 1 is a partial sectional view of a reverse osmosis module made in accordance with this invention.

Referring now to the drawings in detail, FIG. 1 shows a reverse osmosis module 1 for reducing the concentration of dissolved solids in a pressurized liquid such as brine by passing influent liquid through a semipermeable osmotic membrane 3 in a reverse direction to the normal osmotic flow by providing a pressure differential across the membrane, which is higher than the osmotic pressure of the influent liquid. The reverse osmosis module 1, as shown in FIG. 1, comprises a porous sand bar 5 forming a support matrix, the bar or matrix having a plurality of longitudinal holes 7 disposed therein, a plurality of tubular semi-permeable osmotic membranes 3 supported by the walls of the holes 7, an enveloping membrane 9 embracing the outer peripheral surface of the bar, an impervious material 10 such as epoxy, sealing the ends 11 of the bar 5, and a container 13 enclosing the bar 5. The bar is so disposed within the container 13 that there is a space 14 between the bar 5 and the container 13, and the bar 5 is surrounded by pressurized influent liquid. The bar 5, being formed from sand bonded together by a bonding agent similar to those utilized to produce cores and molds in a foundry, inherently withstands relatively large compressive forces, but will fracture or crack, when subjected to high tensile forces. The bonding agent is not soluble in the influent liquid. The pressure of the influent liquid ranges from 5 to 600 psig, which could cause high tensile stresses in the bars, if the outer periphery of the bar were not subject to the same influent pressurized liquid. The enveloping membrane 9 may be any material which will tightly embrace the outer peripheral surface of the bars, i.e., a heat shrinkable film, which is generally not permeable, or a semipermeable cellulose acetate film similar to those used to produce the tubular osmotic membranes 3 disposed within the bars.

The semi-permeable tubular membrane 3, the enveloping membrane 9, and the impervious sealant or sealing material 10 on the ends 11 of the bar 5 cooperate to form a barrier between the bar and the container 13. Influent liquid floods the container side of the barrier subjecting the bar 5 to the compressive forces of the pressurized liquid which exerts outwardly directed forces on the tubular osmotic membranes 3 disposed in the holes 7 and inwardly directed forces on the enveloping membrane 9 and sealed ends 11 to produce only compressive forces on the sand bar 5.

Figure 2:
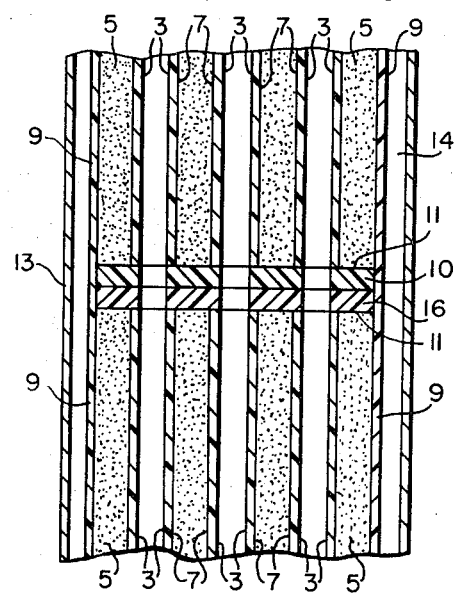
FIG. 2 is a partial sectional view of a joint formed between two sand matrices.

As shown in FIGS. 1 and 2, the epoxy forming the seal 10 on one end of the bar 5 is cast into the shape of a flange 15 extending radially outwardly from one end of the bar. The flange 15 is provided with a duct 17, which places the porous bar in communication with an effluent conduit 19 for draining purified or processed liquid, which has passed through the osmotic membrane, from the porous bar 5.

As shown in FIG. 1, the flange 15 is clamped between a pair of pipe flanges 21, which are welded to the containers 13. In the arrangement shown in FIG. 1, the containers 13 are pipe spool pieces only slightly larger in diameter than the bars 5. The spool pieces are axially aligned to allow series flow of influent liquid through a plurality of the bars. The bars may be joined, as shown in FIG. 2, by having adjacent ends 11 sealed with a sealant 10, such as epoxy, and a continuous tubular film 9 extending over the entire longitudinal length of the joined bars 5. A tubular heat shrinkable film may be used as the outer membrane 9, or individual outer films of semi-permeable osmotic membrane may be applied to the outer periphery of the bars 5 and the bars may be joined by the sealant 10 used to seal the ends 11 thereof. Such an arrangement would provide longer bars and reduce the number of pipe flanges 21 required to assemble a unit formed from the modules.

Figure 3:
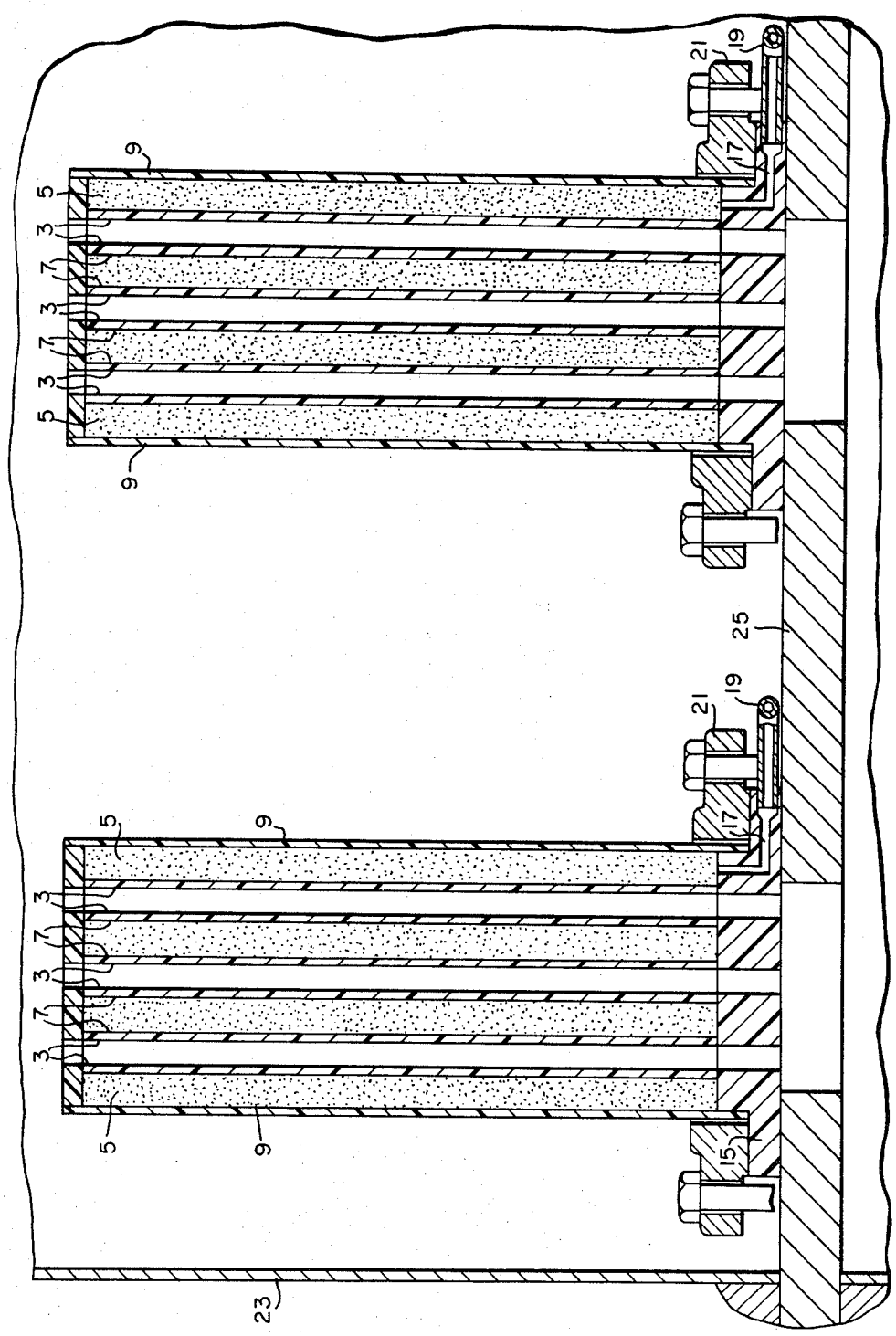
FIG. 3 is a partial sectional view of an alternate arrangement of the sand matrices in a large diameter vessel.

As shown in FIG. 3, a plurality of enveloped bars may be disposed in a large vessel 23 so that they are submerged in the influent liquid. The flanges 15 of the bars are clamped to a support plate or tube sheet 25 in the relatively large diameter vessel 23. Influent liquid floods the vessel 23 subjecting the osmotic membranes 3 and the enveloping membranes 9 to the pressure of the influent liquid, inducing outwardly directed forces on the tubular osmotic membranes 3 disposed in the holes 7 in the bars 5 and inwardly directed forces on the peripheral membranes 9, thus causing the bars 5 to be subjected to compressive forces only. The drain conduits 19 are in communication with the porous bar, connected to a manifold (not shown), and brought to the outside of the vessel to drain off pure effluent, which has passed through the osmotic membranes and into the porous bar 5, thus providing the differential pressure across the osmotic membranes 3, which supply the driving force for the reverse osmosis process.

What we claim is:

1. A reverse osmosis module for reducing the concentration of dissolved solids in a pressurized liquid by passing said liquid through a semi-permeable osmotic member, said module comprising:
    a porous matrix formed of particulate material bonded together to produce a porous bar,
    said bar having at least one longitudinal hole disposed therein,
    a tubular shaped osmotic membrane disposed within said hole,
    a tubular shaped enveloping membrane encompassing and tightly embracing said bar,
    sealing means cooperating with said membranes to form a barrier completely surrounding said bar,
    means in fluid communication with said matrix for draining off liquid which passes through said osmotic membrane,
    a container enclosing said bar,
    said bar being so disposed within said container that said membranes and said sealing means form a barrier which cooperates with said pressurized fluid in such a way that said pressurized fluid imparts only compressive forces to said matrix.

2. A reverse osmosis module as set forth in claim 1, wherein the bar has a plurality of holes disposed lengthwise therein, a tubular shaped osmotic membrane is disposed in each hole, and each hole is in direct fluid communication with said container.

3. A reverse osmosis module as set forth in claim 1, wherein the enveloping membrane is generally impervious to the liquid.

4. A reverse osmosis module as set forth in claim 3, wherein the enveloping membrane is a heat shrinkable film.

5. A reverse osmosis module as set forth in claim 1, wherein at least two bars are placed end to end and a continuous enveloping membrane extends longitudinally over the outer surface of the bars.

* * * * *

Notice of Adverse Decision in Interference

In Interference No. 99,054, involving Patent No. 3,712,473, G. W. Ellenburg, REVERSE OSMOSIS MODULE, final judgment adverse to the patentee was rendered Sept. 14, 1976, as to claims 1, 2 and 3.

[*Official Gazette February 1, 1977.*]